(12) United States Patent (10) Patent No.: US 12,630,075 B2
Sung (45) Date of Patent: May 19, 2026

(54) HEADLAMP CONTROL SYSTEM FOR MOVING OBJECTS AND HEADLAMP CONTROL METHOD FOR MOVING OBJECTS

(71) Applicant: HYUNDAI MOBIS CO., LTD., Seoul (KR)

(72) Inventor: Jun Young Sung, Suwon-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 337 days.

(21) Appl. No.: 18/493,704

(22) Filed: Oct. 24, 2023

(65) Prior Publication Data

US 2024/0198890 A1 Jun. 20, 2024

(30) Foreign Application Priority Data

Dec. 14, 2022 (KR) ........................ 10-2022-0174581

(51) Int. Cl.
*B60Q 1/08* (2006.01)

(52) U.S. Cl.
CPC ........ *B60Q 1/085* (2013.01); *B60Q 2300/122* (2013.01); *B60Q 2300/20* (2013.01); *B60Q 2300/322* (2013.01)

(58) Field of Classification Search
CPC .............. B60Q 1/085; B60Q 2300/122; B60Q 2300/42; B60Q 2300/322; B60Q 2300/112; B60Q 2300/45; B60Q 1/143; B60Q 2300/41; B60Q 1/12; B60Q 2300/056; B60Q 9/008
See application file for complete search history.

(56) References Cited

U.S. PATENT DOCUMENTS

| | | | |
|---|---|---|---|
| 12,030,492 B2 * | 7/2024 | Deschamps ......... | B60W 30/146 |
| 2021/0206313 A1 * | 7/2021 | Won ...................... | F21S 41/657 |
| 2022/0161655 A1 * | 5/2022 | Yeo ..................... | B60K 31/0066 |
| 2025/0012420 A1 * | 1/2025 | Huester ................ | G01C 21/365 |

* cited by examiner

*Primary Examiner* — Wei (Victor) Y Chan
(74) *Attorney, Agent, or Firm* — DLA PIPER LLP US

(57) ABSTRACT

A headlamp control system for moving objects and a headlamp control method for moving objects. The headlamp control system for a moving object includes an information acquisition unit configured to acquire traveling information of the moving object, a control unit configured to control a beam pattern variation width of the lamp based on the traveling information and a road curvature change, in which the control unit determines a driver's cornering propensity on a curved road based on the traveling information received from the information acquisition unit, and controls a beam pattern variation width of the headlamp based on the cornering propensity or the road curvature change.

8 Claims, 3 Drawing Sheets

FIG. 1
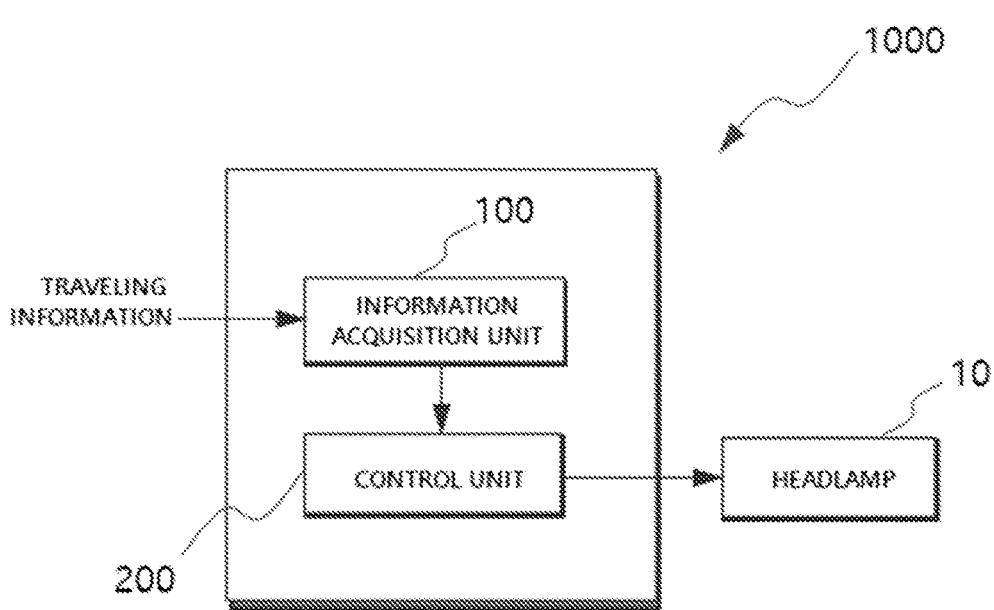
TRAVELING INFORMATION → 100 INFORMATION ACQUISITION UNIT → CONTROL UNIT → 10 HEADLAMP
1000
200
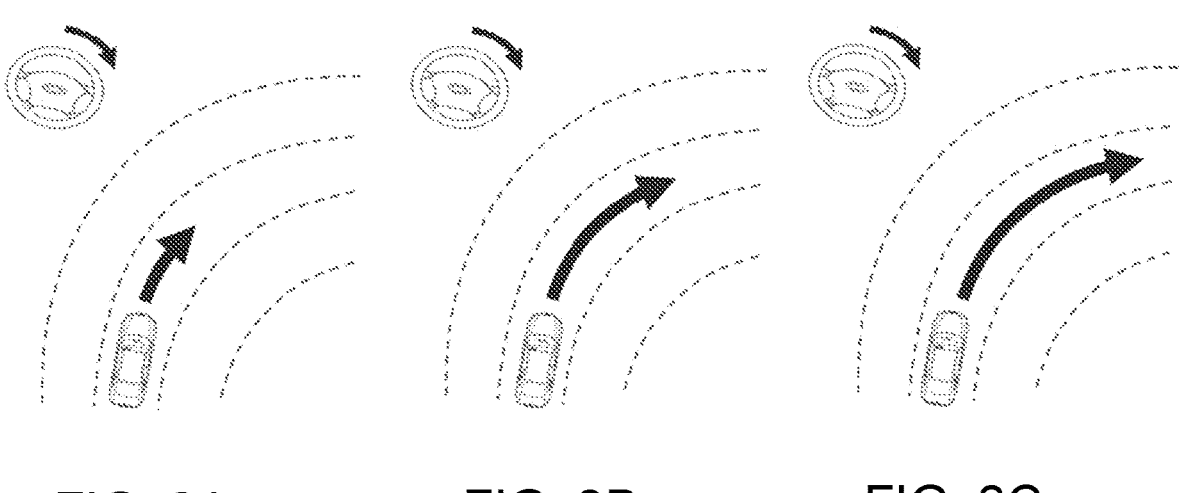
FIG. 2A          FIG. 2B          FIG. 2C

S100 — CLASSIFY GRADE ACCORDING TO CORNERING PROPENSITY IN ENTRY SECTION

S200 — ADD AND APPLY VARIABLE FIRST PARAMETER

S300 — CLASSIFY GRADE ACCORDING TO CORNERING PROPENSITY IN EXIT SECTION

S400 — ADD AND APPLY VARIABLE SECOND PARAMETER

S500 — CONTROL BEAM PATTERN VARIATION WIDTH

HEADLAMP CONTROL SYSTEM FOR MOVING OBJECTS AND HEADLAMP CONTROL METHOD FOR MOVING OBJECTS

CROSS-REFERENCE TO RELATED APPLICATIONS

This application claims priority under 35 U.S.C. § 119 to Korean Patent Application No. 10-2022-0174581, filed on Dec. 14, 2022, in the Korean Intellectual Property Office, the disclosure of which is incorporated herein by reference in its entirety.

TECHNICAL FIELD

The following disclosure relates to a headlamp control system for moving objects and a headlamp control method for moving objects, and more particularly, to a headlamp control system for moving objects and a headlamp control method for moving objects applying a beam pattern tailored to an individual driver based on a driver's cornering propensity.

BACKGROUND

One of the most important factors when driving a car is securing visibility. In particular, it is difficult to secure visibility in the dark evening or at night, so headlamps are essential. However, since a single headlamp may interfere with driving of others on a road where several vehicles are running, there is a limit to illuminate a limited direction and space.

Dynamic bending light (DBL) or static bending light is a technology that secures visibility at night on curved roads by linking steering information. In particular, the dynamic bending light is a system that secures visibility in a direction of travel by adjusting an angle of a headlamp.

Since driving propensities differ according to evaluators, many control parameters are generated and modified during the development process. In addition, although optimal control specifications for each vehicle model are determined through the corresponding process, since drivers also have different driving propensities, just as evaluators have different propensities, the effect of improving visibility may be reduced or excessive glitz may be caused to some drivers.

RELATED ART DOCUMENT

Patent Document

Korean Patent No. 10-1057649 (Published Date: Jul. 1, 2010)

SUMMARY

An embodiment of the present invention is directed to providing a headlamp control system for moving objects and a headlamp control method for moving objects capable of providing personalized and optimal visibility to all drivers by adjusting a beam pattern variation width of a headlamp without separate manipulation based on a driver's cornering propensity.

In one general aspect, a headlamp control system for a moving object controlling the headlamp of the moving object includes: an information acquisition unit configured to acquire traveling information of the moving object; and a control unit configured to control a beam pattern variation width of the headlamp based on the traveling information, in which the control unit determines a driver's cornering propensity on a curved road based on the traveling information, and controls the beam pattern variation width of the headlamp based on the driver's cornering propensity.

The control unit may determine the driver's cornering propensity for an entry section of the curved road and an exit section of the curved road, respectively, by analyzing acceleration propensity in the entry section and the exist section based on the traveling information, and classify the acceleration propensity into a predetermined reference grade based on the determined cornering propensity.

The control unit may classify the grade as a high-speed cornering driver when the cornering propensity is higher than a first reference which is a predetermined reference, classify the grade as a standard cornering driver when the cornering propensity is lower than the first reference and higher than a second reference which is a predetermined reference lower than the first reference, and classify the grade as a low-speed cornering driver when the cornering propensity is lower than the second reference.

The control unit may control the beam pattern variation width of the headlamp by adding a variation width variable parameter to each entry and exit section of the curved road according to the driver's grade.

The traveling information may be acquired from at least one of a steering angle sensor, a radar sensor, a camera sensor, an accelerator pedal sensor, and a brake pedal sensor provided in the moving object.

In another general aspect, a headlamp control method for a moving object controlling the headlamp of the moving object includes: by a control unit, (a) determining a driver's cornering propensity in an entry section of a curved road based on received traveling information of the moving object, and classifying a driver's cornering propensity into a predetermined reference grade based on the determined cornering propensity; (b) adding and applying a variable first parameter based on the grade classified in the entry section of the curved road; (c) determining the driver's cornering propensity in the exit section of the curved road based on the traveling information of the moving object, and classifying the driver's cornering propensity into the predetermined reference grade based on the determined cornering propensity; (d) adding and applying a variable second parameter based on the grade classified in the exit section of the curved road; and (e) controlling a beam pattern variation width of the headlamp based on the first parameter and the second parameter.

In step (a), the driver's cornering propensity may be determined by analyzing an acceleration propensity in the entry section of the curved road.

In step (d), the driver's cornering propensity may be determined by analyzing an acceleration propensity in the exit section of the curved road.

The grade may be classified as a high-speed cornering driver when the cornering propensity is higher than a first reference which is a predetermined reference, the grade may be classified as a standard cornering driver when the cornering propensity is lower than the first reference and higher than a second reference which is a predetermined reference lower than the first reference, and the grade may be classified as a low-speed cornering driver when the cornering propensity is lower than the second reference.

The traveling information may be acquired from at least one of a steering angle sensor, a radar sensor, a camera sensor, an accelerator pedal sensor, and a brake pedal sensor provided in the moving object.

BRIEF DESCRIPTION OF THE DRAWINGS

FIG. 1 is a schematic diagram illustrating a section required to secure visibility according to a driver's acceleration propensity.

FIGS. 2A to 2C are block diagrams illustrating a headlamp control system for moving objects according to an embodiment of the present invention.

DETAILED DESCRIPTION OF MAIN ELEMENTS

Figure 3:
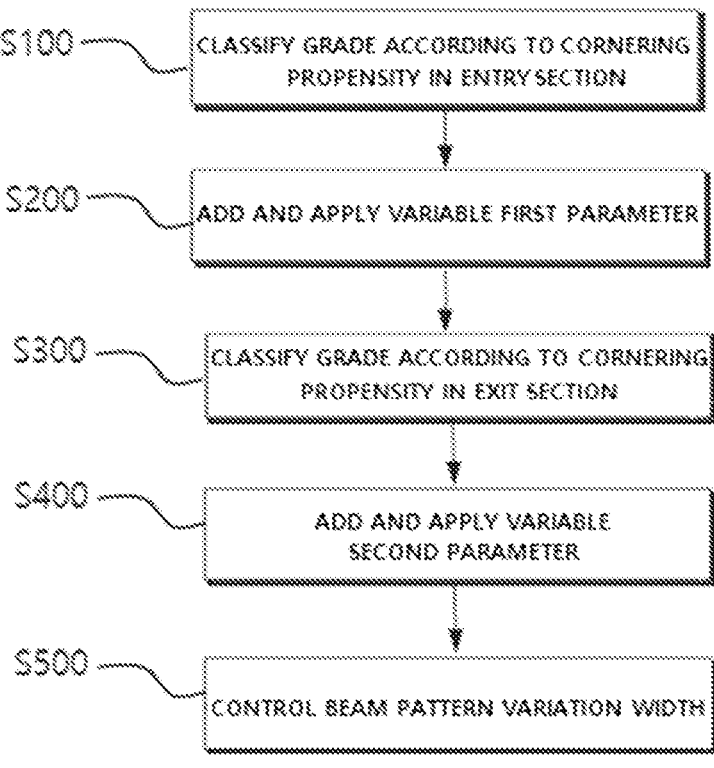
FIG. 3 is a flowchart illustrating a headlamp control method for moving objects according to an embodiment of the present invention.

10: Headlamp
1000: Headlamp control system for moving objects
100: Information acquisition unit
200: Control unit

DETAILED DESCRIPTION OF EMBODIMENTS

In order to explain the present invention and the operational advantages of the present invention and the objects achieved by the practice of the present invention, preferred embodiments of the present invention will be exemplified below and the present invention will be described with reference thereto.

First, the terms used in this application are only used to describe specific embodiments, and are not intended to limit the present invention, and singular expressions may include plural expressions unless the context clearly indicates otherwise. It should be understood that terms "include" or "have" used in the present specification, specify the presence of features, numerals, steps, operations, components, parts mentioned in the present specification, or combinations thereof, but do not preclude the presence or addition of one or more other features, numerals, steps, operations, components, parts, or combinations thereof.

In describing embodiments of the present invention, well-known functions or constructions will not be described in detail since they may unnecessarily obscure the understanding of the present invention.

FIG. 1 is a schematic diagram illustrating a section required to secure visibility according to a driver's acceleration propensity.

FIG. 1A illustrates low-speed cornering, FIG. 1B illustrates standard cornering, and FIG. 1C illustrates high-speed cornering.

Prior to describing the present invention, since the conventional dynamic bending light (DBL) function determines a beam pattern variation width according to steering based on a vehicle model, the beam pattern may be excessively driven in a cornering direction in the case of a driver whose steering change changes rapidly. In this case, there is a problem of lack of visibility. Conversely, in the case of a safe driver, there is a problem in that the visibility is lacking because the beam pattern variation width is small.

Therefore, as illustrated in FIG. 1, the beam pattern variation width should be varied based on a driver's acceleration propensity in the cornering section.

FIGS. 2A to 2C are block diagrams illustrating a headlamp control system for moving objects according to an embodiment of the present invention.

As illustrated in FIGS. 2A to 2C, a headlamp control system 1000 for moving objects for controlling the headlamp 10 of a moving object according to an embodiment of the present invention includes an information acquisition unit 100 and a control unit 200.

The information acquisition unit 100 acquires traveling information of the moving object.

The control unit 200 controls a beam pattern variation width of the headlamp 10 based on the traveling information and the road curvature change.

In this case, the control unit 200 may determine a driver's cornering propensity on a curved road based on the traveling information received from the information acquisition unit 100, and control the beam pattern variation width of the headlamp 10 based on the determined cornering propensity and the road curvature change.

Specially, the traveling information may be acquired from at least one of a steering angle sensor, a radar sensor, a camera sensor, an accelerator pedal sensor, and a brake pedal sensor provided in the moving object.

More specifically, the steering angle sensor may detect a steering angle caused by a driver's steering wheel manipulation. In addition, the radar sensor may detect other moving objects existing in front of the moving object, and the camera sensor may detect a forward image in which the moving object is traveling. For example, the forward image may include an image of lanes on the road. Accordingly, the camera sensor may provide a lane image of a curved road. In addition, the accelerator pedal sensor may detect and provide the traveling speed of the moving object.

Thereafter, the control unit 200 may determine the driver's cornering propensity.

Specifically, the control unit 200 may analyze the acceleration propensity of the driver for each of the entry section and the exit section of the curved road based on the traveling information of the moving object. In addition, the driver's cornering propensity may be determined for the entry section and exit section based on the analyzed acceleration propensity of the driver.

The control unit 200 may classify the acceleration propensity into a predetermined reference grade based on the cornering propensity determined for the entry section of the curved road. Specifically, the control unit 200 may classify a grade as a high-speed cornering driver when the cornering propensity in the entry section of the curved road is higher than a first reference which is a predetermined reference. In addition, the control unit 200 may classify the grade as a standard cornering driver when the cornering propensity is lower than the first reference and higher than a second reference which is a predetermined reference lower than the first reference, and classify the grade as a low-speed cornering driver when the cornering propensity is lower than the second reference.

Similar to the entry section of the curved road, even in the exit section of the curved road, it may also be classified into the predetermined reference grade based on the determined cornering propensity. Specifically, the control unit 200 may classify a grade as the high-speed cornering driver when the cornering propensity in the exit section of the curved road is higher than the first reference which is the predetermined reference. In addition, when the cornering propensity is lower than the first reference and higher than the second reference which is another predetermined reference, the control unit 200 may classify the grade as the standard cornering driver, and classify the grade as the low-speed cornering driver when the cornering propensity is lower than the second reference.

Thereafter, the control unit 200 may control the beam pattern variation width of the headlamp by adding and applying a variable parameter for each of the entry section and the exit section of the curved road based on the classified grade of the driver.

FIG. 3 is a flowchart illustrating a headlamp control method for moving objects according to an embodiment of the present invention.

Figure 4:
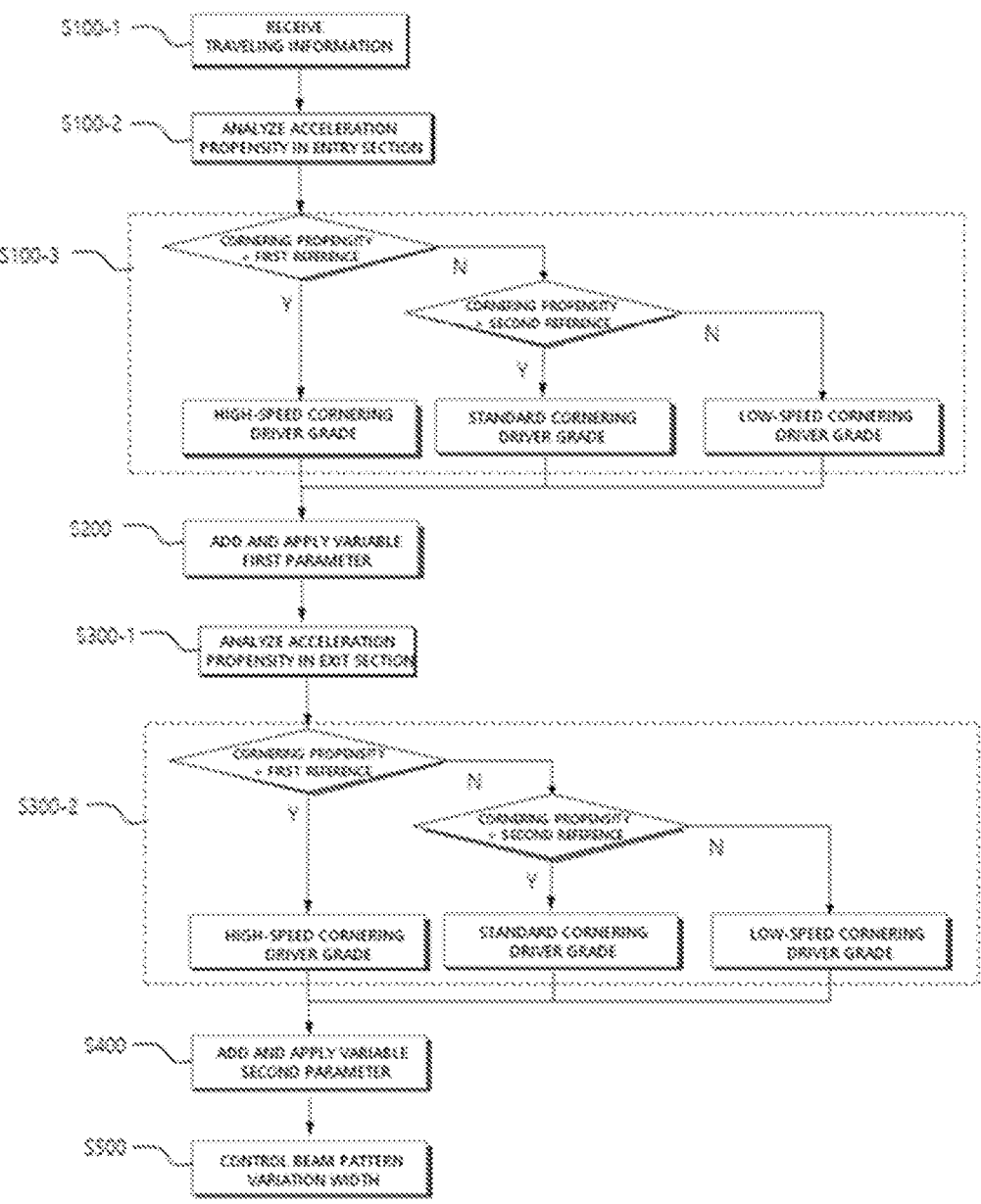
FIG. 4 is a flowchart embodying FIG. 3.

FIG. 4 is a flowchart embodying FIG. 3.

As illustrated in FIGS. 3 and 4, a method of controlling a headlamp 10 for moving objects according to an embodiment of the present invention includes, by the control unit 200, (a) determining a driver's cornering propensity in an entry section of a curved road based on received traveling information of the moving object, and classifying a driver's cornering propensity into a predetermined reference grade based on the determined cornering propensity (S100), (b) adding and applying a first parameter for controlling the beam pattern of the headlamp 10 based on the grade classified in the entry section of the curved road (S200), (c) determining the driver's cornering propensity in the exit section of the curved road based on the traveling information of the moving object, and classifying the driver's cornering propensity into the predetermined reference grade based on the determined cornering propensity (S300), (d) adding and applying a second parameter for controlling the beam pattern of the headlamp 10 based on the grade classified in the exit section of the curved road (S400), and (e) controlling a beam pattern variation width of the headlamp 10 based on the first parameter and the second parameter (S500).

Specially, in step (a), the traveling information may be acquired from at least one of a steering angle sensor, a radar sensor, a camera sensor, an accelerator pedal sensor, and a brake pedal sensor provided in the moving object (S100-1). More specifically, the steering angle sensor may detect a steering angle caused by a driver's steering wheel manipulation. In addition, the radar sensor may detect other moving objects existing in front of the moving object, and the camera sensor may detect a forward image in which the moving object is traveling. For example, the forward image may include an image of lanes on the road. Accordingly, the camera sensor may provide a lane image of a curved road. In addition, the accelerator pedal sensor may detect and provide the traveling speed of the moving object.

In step (a), the driver's cornering propensity may be determined by analyzing an acceleration tendency in the entry section of the curved road (S100-2). Thereafter, it may be classified into a predetermined reference grade based on the cornering propensity determined for the entry section of the curved road (S100-3). Specifically, the control unit 200 may classify a grade as a high-speed cornering driver when the cornering propensity in the entry section of the curved road is higher than a first reference which is a predetermined reference. In addition, the control unit 200 may classify the grade as a standard cornering driver when the cornering propensity is lower than the first reference and higher than a second reference which is a predetermined reference lower than the first reference, and classify the grade as a low-speed cornering driver when the cornering propensity is lower than the second reference.

Therefore, based on the classified grade, the first parameter for controlling the beam pattern of the headlamp 10 may be added and applied (S200).

As described above, when the acceleration propensity of the driver in the entry section of the curved road is analyzed in steps (a) and (b), and the parameters are applied accordingly, then in step (c), the driver's acceleration propensity may also be analyzed for the exit section of the curved road (S300-1). Accordingly, the cornering propensity may be determined based on the analyzed driver's acceleration propensity. In addition, it may be classified into a predetermined reference grade based on the cornering propensity determined for the entry section of the curved road (S300-2). Specifically, the control unit 200 may classify a grade as a high-speed cornering driver when the cornering propensity in the entry section of the curved road is higher than a first reference which is a predetermined reference. In addition, when the cornering propensity is lower than the first reference and higher than the second reference which is another predetermined reference, the control unit 200 may classify the grade as the standard cornering driver, and classify the grade as the low-speed cornering driver when the cornering propensity is lower than the second reference.

Thereafter, based on the classified grade, the second parameter for controlling the beam pattern of the headlamp 10 may be added and applied (S400).

Accordingly, the control unit 200 may control the beam pattern variation width of the headlamp in step (e) based on the first and second parameters (S500).

Through the control system 1000 and control method described above, the optimum visibility may be provided by analyzing the driver's acceleration propensity based on individual drivers rather than analyzing the driver's acceleration propensity based on the conventional vehicle models and applying the customized beam pattern.

Accordingly, it is possible to provide the optimal visibility to all drivers regardless of the vehicle model, and it is not necessary to add a separate part because the traveling information is acquired through sensors already installed in the moving object and the driver's acceleration propensity is analyzed based on the acquired traveling information.

As described above, according to a headlamp control system for moving objects and a headlamp control method for moving objects according to various embodiments of the present invention, it is possible to individually provide optimal visibility to all drivers regardless of a vehicle model.

In addition, by improving driver's convenience through an analysis of a driver's driving propensity, it is possible to solve the problem that the majority of drivers cannot use a parameter setting function due to an overflow of functions according to the trend of electrification of a vehicle.

In addition, since a driver's propensity is analyzed based on sensor information scattered in a vehicle, there is no need to add additional parts, and thus there is no increase in cost.

Although preferred embodiments of the present invention have been described above, the embodiments disclosed in the present invention are only for explaining, not limiting, the technical spirit of the present invention. Accordingly, the technical spirit of the present invention includes not only each disclosed embodiment, but also a combination of the disclosed embodiments, and further, the scope of the technical spirit of the present invention is not limited by these embodiments. In addition, many modifications and alterations of the present invention may be made by those skilled in the art to which the present invention pertains without departing from the spirit and scope of the accompanying claims. In addition, it is to be considered that all of these modifications and alterations fall within the scope of the present invention.

What is claimed is:

1. A headlamp control system for a moving object, the headlamp control system comprising:
an information acquisition unit configured to acquire traveling information of the moving object; and
a control unit configured to control a beam pattern variation width of the headlamp based on the traveling information,
wherein the control unit is configured to determine a driver's cornering propensity on a curved road based on the traveling information, and control the beam pattern variation width of the headlamp based on the driver's cornering propensity;
wherein the control unit is configured to:
determine the driver's cornering propensity for an entry section of the curved road and an exit section of the curved road, respectively, by analyzing acceleration propensity in the entry section and the exit section based on the traveling information, and
classify the acceleration propensity into a predetermined reference grade based on the determined cornering propensity, wherein the control unit is configured to:
classify the grade as a high-speed cornering driver when the cornering propensity is higher than a first reference which is a predetermined reference,
classify the grade as a standard cornering driver when the cornering propensity is lower than the first reference and higher than a second reference which is a predetermined reference lower than the first reference, and
classify the grade as a low-speed cornering driver when the cornering propensity is lower than the second reference.

2. The headlamp control system of claim 1, wherein the control unit is configured to control the beam pattern variation width of the headlamp by adding a variation width variable parameter to each entry and exit section of the curved road according to the driver's grade.

3. The headlamp control system of claim 1, wherein the traveling information is acquired from at least one of a steering angle sensor, a radar sensor, a camera sensor, an accelerator pedal sensor, and a brake pedal sensor provided in the moving object.

4. A headlamp control method for a moving object, the headlamp control method performed by a control unit and comprising:

determining a driver's cornering propensity in an entry section of a curved road based on received traveling information of the moving object, and classifying a driver's cornering propensity into a predetermined reference grade based on the determined cornering propensity;
adding and applying a variable first parameter based on the grade classified in the entry section of the curved road;
determining the driver's cornering propensity in an exit section of the curved road based on the traveling information of the moving object, and classifying the driver's cornering propensity into the predetermined reference grade based on the determined cornering propensity;
adding and applying a variable second parameter based on the grade classified in the exit section of the curved road; and
controlling a beam pattern variation width of the headlamp based on the first parameter and the second parameter.

5. The headlamp control method of claim 4, wherein the driver's cornering propensity is determined by analyzing an acceleration propensity in the entry section of the curved road.

6. The headlamp control method of claim 4, wherein the driver's cornering propensity is determined by analyzing an acceleration propensity in the exit section of the curved road.

7. The headlamp control method of claim 5, wherein:
the grade is classified as a high-speed cornering driver when the cornering propensity is higher than a first reference which is a predetermined reference,
the grade is classified as a standard cornering driver when the cornering propensity is lower than the first reference and higher than a second reference which is a predetermined reference lower than the first reference, and
the grade is classified as a low-speed cornering driver when the cornering propensity is lower than the second reference.

8. The headlamp control method of claim 4, wherein the traveling information is acquired from at least one of a steering angle sensor, a radar sensor, a camera sensor, an accelerator pedal sensor, and a brake pedal sensor provided in the moving object.

* * * * *